United States Patent [19]

Auel et al.

[11] Patent Number: 4,704,211

[45] Date of Patent: Nov. 3, 1987

[54] PROCESS FOR THE PRODUCTION OF CRYSTALLINE ALKALI METAL ALUMINUM PHOSPHATE

[75] Inventors: Theodor Auel, Edingen-Neckarhausen; Hans Mueller-Starke, Heidelberg; Erwin Stoffel, Laudenbach, all of Fed. Rep. of Germany

[73] Assignee: Benckiser-Knapsack GmbH, Dr. Albert-Reimann, Fed. Rep. of Germany

[21] Appl. No.: 880,061

[22] Filed: Jun. 30, 1986

[30] Foreign Application Priority Data

Jul. 3, 1985 [DE] Fed. Rep. of Germany ....... 3523686

[51] Int. Cl.$^4$ .............................................. C01B 25/26
[52] U.S. Cl. ......................................... 252/1; 423/306
[58] Field of Search ............................. 423/306; 252/1

[56] References Cited

U.S. PATENT DOCUMENTS

| | | | |
|---|---|---|---|
| 2,550,490 | 4/1951 | McDonald | 23/105 |
| 2,550,491 | 4/1951 | McDonald | 99/95 |
| 2,957,750 | 10/1960 | Knox et al. | 23/105 |
| 2,995,421 | 8/1961 | Dyer | 23/105 |
| 3,109,738 | 11/1963 | Tucker | 99/94 |
| 3,205,073 | 9/1965 | Blanch et al. | 99/95 |
| 3,311,448 | 3/1967 | Blanch et al. | 23/105 |
| 3,311,872 | 11/1968 | Post et al. | 23/105 |
| 3,501,314 | 3/1970 | Kichline et al. | 99/95 |
| 4,289,739 | 9/1981 | Chiang et al. | 423/306 |
| 4,375,456 | 3/1983 | Chiang | 423/306 |

FOREIGN PATENT DOCUMENTS

| | | |
|---|---|---|
| 0031803 | 7/1983 | European Pat. Off. . |
| 1191795 | 12/1965 | Fed. Rep. of Germany . |
| 2707271 | 10/1977 | Fed. Rep. of Germany . |
| 2730226 | 1/1978 | Fed. Rep. of Germany . |
| 2749581 | 5/1978 | Fed. Rep. of Germany . |

Primary Examiner—John Doll
Assistant Examiner—Wayne A. Langel
Attorney, Agent, or Firm—Schwartz, Jeffery, Schwaab, Mack, Blumenthal & Evans

[57] ABSTRACT

A process for the production of crystalline alkali metal aluminum phosphate represented by the formula $$Na_aK_bH_cAl_d(PO_4)_e \cdot xH_2O$$

wherein a has a value of from 0.5 to 1.5, b has a value of from 0 to 0.5, c has a value of from 12 to 16, d has a value of from 2.7 to 3.3, e has a value of from 7 to 9 and x has a value of from 3 to 6, and wherein $a+b+c+3d=3e$, comprises mixing phosphoric acid, sodium hydroxide or sodium carbonate and potassium hydroxide or potassium carbonate in aqueous solution with aluminum hydroxide, potassium oxide or aluminum oxide hydrate in amounts defined by the above formula, with a content of free water in solution ranging from 5 to 44%. The reaction mixture is then heated at a temperature of from 80° to 200° C. (if necessary, under elevated pressure) such that partial crystallization takes place. The free water is thereafter completely removed, if necessary under reduced pressure, at a temperature between about 60° to 130° C., and the crystallization is completed.

16 Claims, No Drawings

PROCESS FOR THE PRODUCTION OF CRYSTALLINE ALKALI METAL ALUMINUM PHOSPHATE

BACKGROUND OF THE INVENTION

The present invention relates to a new and improved process for the production of crystalline alkali metal aluminum phosphates. More particularly, the present invention relates to a process for the production of crystalline alkali metal aluminum phosphates, referred to as "SALP," that are represented by the formula:

$$Na_aK_bH_cAl_d(PO_4)_e \cdot xH_2O,$$

wherein a has a value of from 0.5 to 1.5 and preferably of from 0.8 to 1.1, b has a value of from 0 to 0.5, c has a value of from 12 to 16, d has a value of from 2.7 to 3.3, e has a value of from 7 to 9 and x has a value of from 3 to 6.

SALP is used as a bakery rising acid in finished pastry, deep-cooled pastry, baking mixtures and self-rising flours, among other compositions. The properties and uses of SALP are described in detail in U.S. Pat. Nos. 2,550,491, 3,109,738 and 3,501,314, and in West German Offenlegungsschriften No. 27 30 226 and No. 27 49 581.

SALP is usually produced from phosphoric acid, sodium hydroxide or sodium carbonate, and aluminum hydroxide. Depending upon the water content of the reactants, a reaction mixture is obtained, as a viscous supersaturated solution, which contains about 5 to 44% of free water. For purposes of this description, the phrase "free water" is understood to mean the total water content of the reaction mixture, less the content of water of crystallization of the product.

Dry SALP is obtained from this viscous solution either by precipitation with a methanol/water mixture (U.S. Pat. No. 2,550,490); by evaporation of the water discontinuously (U.S. Pat. No. 2,957,750) or continuously (West German Auslegeschrift No. 11 91 795; U.S. Pat. No. 3,311,448) operating kneading apparatus; by spray drying (U.S. Pat. No. 2,995,421) or by precipitation with dilute phosphoric acid (European patent application No. 0 031 803).

It is a common feature of all precipitation processes (as exemplified in U.S. Pat. No. 2,550,490 and European patent application No. 0 031 803) that the yields obtained are generally unsatisfactory, ranging from about 60 to 70%. The amounts of waste water produced in these processes also give rise to problems. Furthermore, a precipitation with methanol is considered infeasible because of the unavoidable contamination of the product with toxic methanol.

Spray drying (U.S. Pat. No. 2,995,421) gives an amorphous product which is very hygroscopic. But SALP must be distinctly crystalline and not very hygroscopic to be useful as a bakery rising acid.

West German Auslegeschrift No. 11 91 795 (corresponding to U.S. Pat. No. 3,311,448) discloses a process whereby SALP is produced discontinuously in the form of a viscous supersaturated solution, which is then passed continuously through an intermediate container to a crystallization apparatus (kneader). The reaction solution is there applied to an existing bed of crystalline SALP.

In this and the other drying processes previously mentioned, the reaction mixture passes through a phase of extremely high viscosity shortly before crystallization, resulting in high stresses on the working-up apparatus. This problem is evident from a statement in West German patent specification No. 11 91 795 that the viscosities which arise in the production of acidic sodium aluminum phosphates can only be quantitatively suppressed with difficulty since they lie outside of the range of conventional viscosimeters, perhaps in the range of from 100,000 to 200,000 cP. The viscosity of the phase predent immediately before crystallization corresponds roughly to that of synthetic resin asphalts or of the non-volatile components of mineral oil.

For these processes, therefore, it is necessary to use powerful kneading devices, which are costly and consume large amounts of energy.

The poor working-up capacity of the reaction mixtures described heretofore is due to the fact that, in the prior-art processes, the free water has already been removed from the reaction mixtures before the crystallization commences. As a result, the reaction mixture is first present as a supersaturated viscous "solution." Shortly before the complete removal of the free water, crystallization takes place spontaneously. At this point, the extreme increase of the viscosity also occurs, and the product can only be kept moving with overdimensioned driving apparatus. Of course, this extreme stressing also results in increased wear.

SUMMARY OF THE INVENTION

Therefore, it is an object of the present invention to provide a process that permits the production of crystalline SALP while avoiding extreme mechanical stressing of the crystallization apparatus.

It is also an object of the present invention to provide a distinctly crystalline SALP which is finely granular even without grinding.

According to the present invention, this object is achieved by heating a clear, low viscosity reaction mixture of phosphoric acid, aqueous sodium hydroxide solution and aluminum hydroxide for a comparatively long time, preferably at a temperature between about 80° to 200° C., to effect partial crystallization; and only then completely removing the free water from the reaction mixture and completing the crystallization.

More specifically, in accomplishing the foregoing objects, there has been provided, in accordance with one aspect of the present invention, a process for the production of crystalline alkali metal aluminum phosphate, comprising the steps of (A) providing an aqueous solution comprised of phosphoric acid, sodium hydroxide or sodium carbonate, and aluminum hydroxide or aluminum oxide hydrate, the solution having a free water content in the range from about 5% to 44%; (B) heating the solution, at a temperature between about 80° and 200° C., such that partial crystallization occurs in the solution; and then (C) removing substantially all free water from the solution at a temperature between about 60° and 130° C. to form the crystalline alkali metal aluminum phosphate, wherein the solution of step (A) contains amounts, respectively, of phosphoric acid, sodium hydroxide or sodium carbonate, and aluminum hydroxide or aluminum oxide such that the aluminum phosphate is represented by the formula $Na_aK_bH_cAl_d(PO_4)_e \cdot xH_2O$, wherein a has a value of from 0.5 to 1.5, b has a value of from 0 to 0.5, c has a value of from 12 to 16, d has a value of from 2.7 to 3.3, e has a value of from 7 to 9, x has a value of from 3 to 6, and $a+b+c+3d=3e$. In a preferred embodiment, step (B) comprises heating the solution at a temperature between about 80° and 200° C., while step (C) comprises removing substantially all free water from the solution at a temperature between about 60° and 130° C.

In accordance with another aspect of the present invention, a finely granular, crystalline SALP has been provided which is a product of the above-described process, wherein step (A) comprises adding to the solution an amount of phosphoric acid such that P is present in stoichiometric excess to Na and/or Al in the solution; and step (B) comprises adding to the solution, after the commencement of crystallization, an amount of sodium hydroxide and/or aluminum hydroxide or aluminum oxide hydrate such that the P:Al stoichiometric ratio conforms to the formula.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become appaent to those skilled in the art from this detailed description.

DETAILED DESCRIPTION OF THE PREFERRED EMBODIMENTS

In the present invention, the values for a, b, c, d and e in the above-described formula are selected so that the relationship $a+b+c+3d=3e$ is always ensured. An alkali metal aluminum phosphate of the formula $NaH_{14}Al_3(PO_4)_8 \cdot 4H_2O$, produced in accordance with the present invention, is especially preferred.

Crystallization of the SALP is, according to the present invention, achieved by slowly distilling off the free water, preferably at ambient pressures. By contrast, the drying times for SALP batches prepared according to the prior art are usually about 40 minutes (see, e.g., West German Auslegeschrift No. 11 91 795). If, in the present invention, the time to complete removal of the free water is prolonged to between 1 and 10 hours, preferably 2 to 4 hours, and the reaction mixture is maintained at boiling temperature during this time, then a crystalline product is obtained without the previously described extreme increase in mixture viscosity. Heating the reaction mixture under reflux without distilling off the water also results, according to the present invention, in the crystallization of the SALP. Thereafter, the free water can be rapidly removed under normal or reduced pressure. By this method of operation, the crystalline products are obtained without extreme stressing of the operating plant.

In accordance with a preferred embodiment of the present invention, the crystallization of SALP is carried out by heating in a closed vessel to a temperature of from about 110° to 200° C., preferably of from 130° to 160° C., for from 10 to 60 minutes. A pressure of from 1.1 to 12 bar is thereby built up in the reaction vessel. This approach has the advantage that the crystallization time is enormously shortened over that achieved when crystallization is carried out at normal pressure and lower temperatures. Depending upon the temperature employed, crystallization can proceed very considerably after 10 to 60 minutes, pursuant to this embodiment of the present invention. Thereafter, the reaction vessel is decompressed and the free water is rapidly distilled off.

Adequate amounts of free water in the reaction mixture are important to the commencement of crystallization. The content of free water should be at least 5%, and preferably between about 10% and 30%. The minimum content of free water is limited by the viscosity of the reaction mixture, which increases as the water content decreases. On the other hand, the maximum amount of free water is limited by the solubility of the aluminum phosphate; as a rule, the maximum value is determined by the water content of the reactants.

The onset of crystallization can be very readily detected by monitoring the increasing turbidity of the reaction mixture. At the point in time crystallization begins, however, the viscosity of the reaction mixture is still low. A slight increase of the viscosity is first observed towards the end of the water-evaporation step. But this increase is by no means so marked as in the case of the known processes.

It is important to keep the temperature of the reaction mixture as high as possible during the crystallization in order to ensure sufficient speed of crystallization. At ambient temperature, the speed of crystallization of SALP is so low that even reaction mixtures seeded with SALP crystals display virtually no crystallization even after three months.

The process according to the present invention can be used, not only for producing SALP represented by the formula $NaH_{14}Al_3(PO_4)_8 \cdot 4H_2O$, but also for making the broad class of compounds represented by the formula $Na_aK_bH_cAl_d(PO_4)_e \cdot xH_2O$, wherein a has a value of from 0.5 to 1.5, preferably from 0.8 to 1.1; b has a value of from 0 to 0.5; c has a value of from 12 to 16; d has a value of from 2.7 to 3.3; e has a value of from 7 to 9 and x has a value of from 3 to 6, the values of a, b, c, d and e being chosen to satisfy the relationship $a+b+c+3d=3e$.

In the production of SALP having the formula $NaH_{14}Al_3(PO_4)_8 \cdot 4H_2O$ from, for example, phosphoric acid, aqueous sodium hydroxide solution and aluminum oxide, if the components are used in the ratio of 8:1:3 and the reaction mixture is brought to crystallization according to the present invention, then a coarsely crystalline SALP is obtained which, for most uses, still must be ground. A processing method which did not necessitate subsequent grinding would represent a considerable improvement of the production process. Surprisingly, we have found that a finely divided, crystalline SALP is obtained when a stoichiometric excess of phosphoric acid is used, relative to aluminum or aluminum and sodium, and this reaction mixture is crystallized pursuant to the present invention.

For example, the excess of phosphoric acid can be partly or completely compensated for by the subsequent addition of aluminum hydroxide or aluminum oxide hydrate. In this context, "complete compensation" means that the P:Al ratio in the product conforms to the abovementioned general formula for SALP, and is preferably about 8:3. By the same token, if the initial stoichiometric imbalance involves P and Na (or both Na and Al) then compensation is effected in the second stage by the addition of sodium hydroxide (or both sodium hydroxide and aluminum hydroxide or aluminum oxide hydrate) to bring the stoichiometric ratio(s) into conformance with the general SALP formula, e.g., so that P:Na is preferably about 8:1. In any event, the compensation step is preferably carried out when the crystallization has already substantially advanced but the reaction mixture still contains sufficient free water to be able to react completely with the added aluminum hydroxide.

The excess of phosphoric acid which is sufficient to obtain a finely granular SALP is from 3 to 30%, an excess of from 5 to 15% being preferred. In this way, a SALP is obtained which can be used directly as a bakery rising acid, without additional grinding. Typically, 90 to 98% of the product prepared in accordance with the present invention is characterized by a grain size below 90 μm.

As previously mentioned, SALP is known to be very hygroscopic. For use as a bakery rising acid, especially in finished flours and in bakery mixtures, this high hygroscopicity is disadvantageous, since storage of these mixtures at high temperatures and at a high atmospheric humidity results in caking.

The hygroscopic property of the SALP produced according to the present invention can be reduced by adaptation of known processes to the present invention. For example, hygroscopicity can be reduced by the partial replacement of the sodium and/or of the hydrogen by potassium. The potassium can thus be introduced before crystallization in the form of potassium hydroxide, potassium oxide or potassium carbonate, or after crystallization in the form of potassium chloride, potassium sulphate or potassium phosphate (see U.S. Pat. No. 3,205,073 and No. 3,411,872; West German Offenlegungsschriften No. 27 30 226 and No. 27 07 271). Hygroscopicity can also be reduced by covering the SALP crystals with calcium phosphates. This covering is achieved by mixing the SALP crystals with calcium phosphates, calcium hydroxide or calcium carbonate (see West German Offenlegungsschrift No. 27 30 226).

The following examples are given further to illustrate and describe the present invention. If not stated otherwise, the crystallization of the SALP is carried out in a heatable kneading apparatus with a product capacity of 1.5 kg and a maximum working capacity of 1.1 kW.

COMPARATIVE EXAMPLE (ACCORDING TO THE PRIOR ART)

1424 g of 82.6% phosphoric acid were placed in a reaction vessel equipped with a stirrer and a reflux condenser, and 120 g of 50% aqueous sodium hydroxide solution were added while stirring. After the solution was added, the mixture was heated to 90° C. and 351 g of aluminum hydroxide were added. In this fashion, the reaction mixture was heated to boiling temperature. The resulting clear, viscous solution was transferred to the heated kneading apparatus, and the free water was evaporated in 40 minutes under normal pressure.

With increasing loss of water, the viscosity of the mixture increased, as was reflected in the increasing working of the kneader. Shortly before complete removal of the free water, the working capacity maximum of the apparatus was reached and the kneader was blocked. A glass-like, very viscous amorphous mass, permeated with some SALP crystals, was thereby obtained.

EXAMPLE 1

120 g of a 50% aqueous sodium hydroxide solution were rapidly added, while stirring, to 1424 g of 82.6% phophoric acid, the resulting mixture was heated to 90° C., and 351 g of aluminum hydroxide were then added over the course of 20 minutes. In this manner the mixture was heated to boiling.

The initially clear solution was refluxed, with stirring, causing the mixture to become more and more turbid as a result of the separation of crystals. The viscosity remained unchanged. After 4 hours, the resulting crystal slurry was transferred to the heated kneading apparatus and the free water was removed over the course of about an hour. Without a readily observable increase in the working capacity of the mixture, there were obtained 1400 g. of a coarsely crystalline powder which, with the help of X-ray diffractometry, was identified as $NaH_{14}Al_3(PO_4)_8 \cdot 4H_2O$.

EXAMPLE 2

95 kg of 82.6% phosphoric acid were placed in a heatable pressure reactor, 8 kg of a 50% aqueous sodium hydroxide solution were rapidly added, and the mixture was heated to 90° C. Aluminum hydroxide (23.4 g) was then added in the course of 15 minutes. The reaction mixture was in this way heated to boiling.

The initially clear solution was kept at the boiling temperature and, over 4 hours, the free water was distilled off under normal pressure. Without a noteworthy increase in the working capacity of the mixer, 95 kg of a coarsely crystalline SALP were obtained.

EXAMPLE 3

In accordance with the procedure of Example 2, 95 kg of 82.6% phosphoric acid, 8 kg of 50% aqueous sodium hydroxide solution and 23.4 kg aluminum hydroxide were mixed and heated to 150° C. in a closed pressure reactor. The progress of crystallization in the mixture was readily monitored by reference to the increasing turbidity of the reaction mixture. After 30 minutes, the reactor was slowly depressurized and the free water thereby distilled off.

94 kg of coarsely crystalline SALP were obtained without an observable increase in the working capacity of the mixer.

EXAMPLE 4

In accordance with the procedure of Example 1, 1566 g of 82.6% phosphoric acid, 120 g of a 50% aqueous sodium hydroxide solution and 351 g aluminum hydroxide were mixed, and the reaction mixture was refluxed for 4 hours. The resulting crystal slurry was transferred to a heated kneading apparatus and the free water was distilled off under vacuum. After 20 minutes, 35 g of aluminum hydroxide were added. After an additional 10 minutes of vacuum drying, there were obtained 1480 g of a finely crystalline SALP, 90% of which had a crystal size of less than 90 μm.

EXAMPLE 5

In accordance with Example 2, 1566 g of 82.6% phosphoric acid, 132 g of 50% aqueous sodium hydroxide solution and 351 g aluminum hydroxide were mixed, and water distilled off under normal pressure from the initially clear mixture. After 3 hours, 18 g aluminum hydroxide were added to the still moist crystal slurry, and water was distilled off for a further hour. There were obtained 1470 g of a finely crystalline SALP, 95% of which had a crystal size below 90 μm.

EXAMPLE 6

As in Example 2, 98 kg of 82.6% phosphoric acid, 8 kg of 50% aqueous sodium hydroxide solution and 23.4 kg aluminum hydroxide were mixed and heated to 170° C. in the closed pressure reactor. After 30 minutes, the reactor was depressurized and most of the free water thereby removed. After the addition to the mixture of 1.2 kg aluminum hydroxide, the residual water was distilled off under normal pressure. There were obtained 97 kg of a finely crystalline SALP, 97% of which has a crystal size below 90 μm.

What is claimed is:

1. A process for the production of crystalline alkali metal aluminum phosphate consisting essentially of the steps of:

(A) providing an aqueous solution comprised of phosphoric acid, sodium hydroxide or sodium carbonate, potassium hydroxide, potassium oxide or potassium carbonate, and aluminum hydroxide or aluminum oxide hydrate, said solution having a free water content in the range from about 5% to 44%;

(B) heating said solution such that partial crystallization occurs in said solution; and then (C) removing substantially all free water from said solution to form said crystalline alkali metal aluminum phosphate, wherein said solution in step (A) contains amounts, respectively, of phosphoric acid, sodium hydroxide or sodium carbonate, and aluminum hydroxide or aluminum oxide such that said crystalline alkali metal aluminum phosphate is represented by the formula $$Na_aK_bH_cAl_d(PO_4)_e \cdot xH_2O,$$

wherein a has a value of from 0.5 to 1.5, b has a value of from 0 to 0.5, c has a value of from 12 to 16m, d has a value of from 2.7 to 3.3, e has a value of from 7 to 9, x has a value of from 3 to 6, and $a+b+c+3d=3e$.

2. A process according to claim 1, wherein step (B) comprises heating said solution at a temperature between about 80° and 200° C.

3. A process according to claim 1, wherein step (C) comprises removing substantially all free water from said solution at a temperature between about 60° and 130° C.

4. A process according to claim 1, wherein a has a value of from 0.8 to 1.1.

5. A process according to claim 1, wherein said solution in step (A) has a free water content of from about 10 to 30%.

6. A process according to claim 1, wherein said crystalline alkali metal aluminum phosphate in step (C) is represented by the formula $NaH_{14}Al_3(PO_4)_8 \cdot 4H_2O$.

7. A process according to claim 1, wherein step (C) comprises heating said solution such that an increase in turbidity of said solution occurs.

8. A process according to claim 1, wherein step (B) comprises maintaining said solution at boiling temperature for between about 1 to 10 hours.

9. A process according to claim 5, wherein said solution is maintained at boiling temperature for between about 2 to 4 hours.

10. A process according to claim 1, wherein step (B) comprises heating said mixture under a pressure of up to 12 bar to a temperature of from about 110° to 200° C. for about 10 to 60 minutes.

11. A process according to claim 10, wherein said solution is heated to a temperature between about 130° to 160° C.

12. A process according to claim 1, wherein step (A) comprises adding to said solution an amount of phosphoric acid such that P is present in stoichiometric excess to NA and/or Al in said solution; and step (B) comprises adding to said solution, after the commencement of crystallization, an amount of sodium hydroxide and/or aluminum hydroxide or aluminum oxide hydrate such that the P:Al stoichiometric ratio conforms to said formula.

13. A process according to claim 12, wherein said P:Al stoichiometric ratio is about 8:3.

14. A process according to claim 12, wherein said P:Na stoichiometric ratio is about 8:1.

15. A process according to claim 1, further consisting essentially of the step, after step (C), of adding an amount of potassium chloride, potassium sulphate or potassium phosphate to said crystalline alkali metal aluminum phosphate, said amount being sufficient to reduce hygroscopicity of the crystalline material.

16. A process according to claim 1, further consisting essentially of the step, after step (C), of covering said crystalline alkali metal aluminum phosphate with a calcium phosphate.

* * * * *